United States Patent [19]

Mehall

[11] 3,933,027

[45] Jan. 20, 1976

[54] APPARATUS AND METHOD FOR PROVING METERS

[76] Inventor: Francis J. Mehall, 305 W. Sheridan Ave., DuBois, Pa. 15801

[22] Filed: Oct. 15, 1974

[21] Appl. No.: 514,950

[52] U.S. Cl. .................................................. 73/3
[51] Int. Cl.² .......................................... G01F 25/00
[58] Field of Search .................................. 73/3, 237

[56] References Cited
UNITED STATES PATENTS

| 3,092,991 | 6/1963 | Thompson, Jr. ............................ 73/3 |
| 3,324,707 | 6/1967 | Charbonnier ............................... 73/3 |

Primary Examiner—Donald O. Woodiel
Attorney, Agent, or Firm—B. P. Fishburne, Jr.

[57] ABSTRACT

A pre-programmed electronic calculator and method for "proving" gas meters and the like by controlling a prover bell, receiving electrical clock pulses relating to unit volumes respectively measured from a prover bell and from a gas meter under test attached to the prover bell whereby exact unit volumes are measured as units of time, calculating the relationship (ratio) of one measured volume to the other and displaying the numerical quantity of this ratio as a percentage.

14 Claims, 7 Drawing Figures

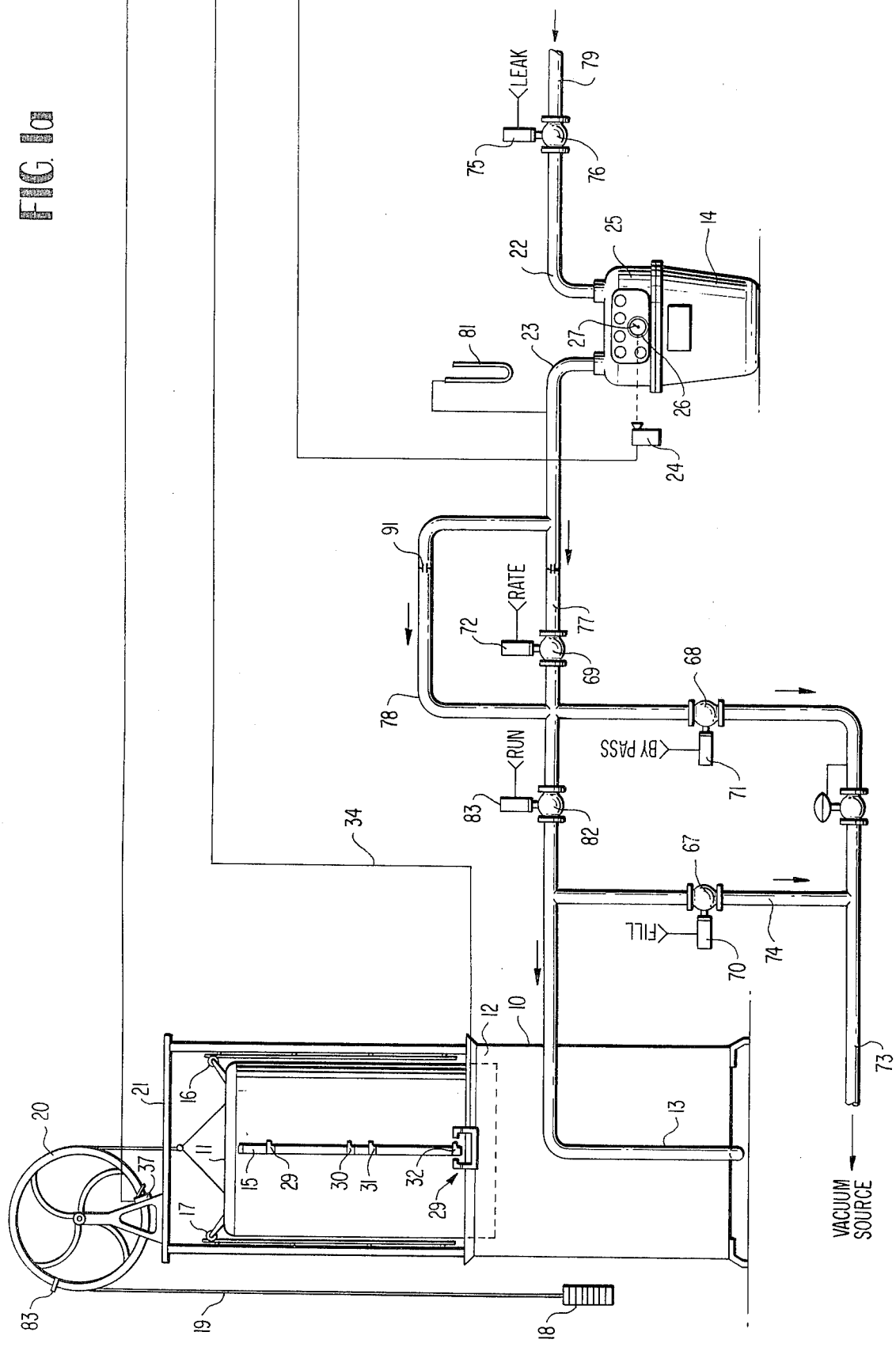

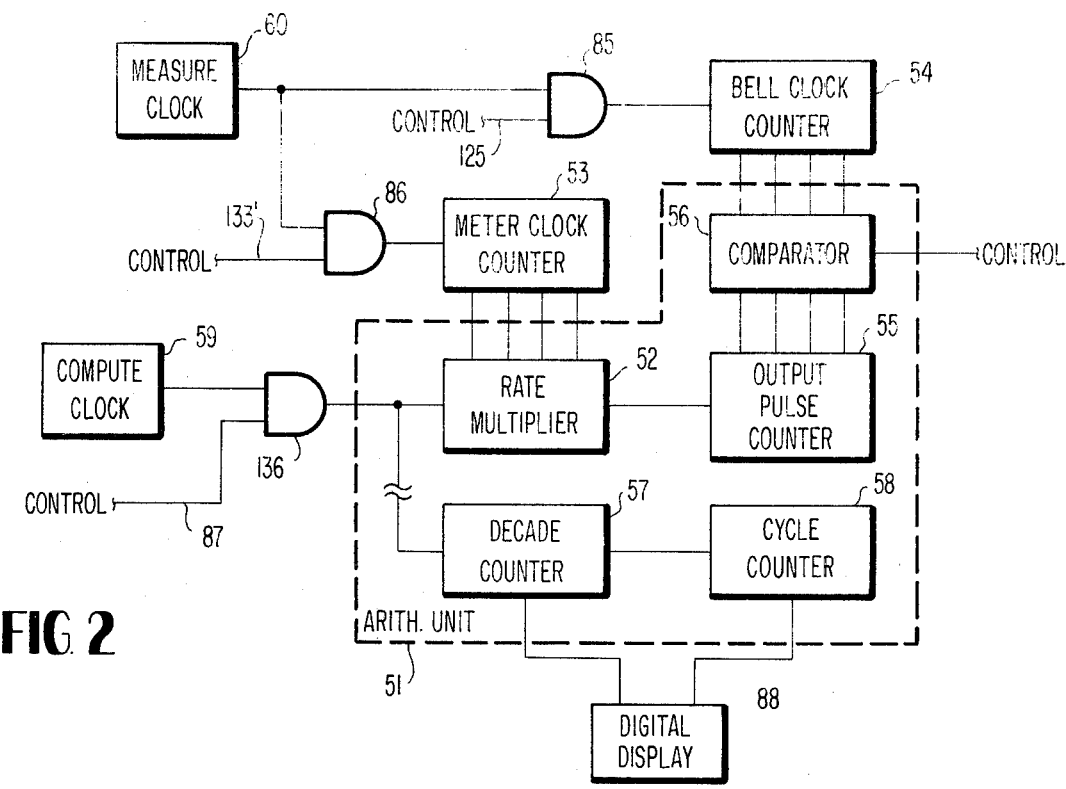
FIG. 2
FIG. 3
| NO. OF CYCLES | RATE MULT. PULSES OUT | CONTENT OF OUTPUT PULSE COUNTER | CONTENT OF CYCLE COUNTER | COMPARATOR OUTPUT |
|---|---|---|---|---|
| 0 | 0 | 0 | 0 | ≠ |
| 1 | 2 | 2 | 1 | ≠ |
| 2 | 2 | 4 | 2 | ≠ |
| 3 | 2 | 6 | 3 | = |
FIG. 5
$C = A \cdot B$
| A | B | C |
|---|---|---|
| 0 | 0 | 0 |
| 0 | 1 | 0 |
| 1 | 1 | 1 |
| 1 | 0 | 0 |
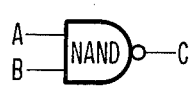
$C = \overline{A \cdot B}$
| A | B | C |
|---|---|---|
| 0 | 0 | 1 |
| 0 | 1 | 1 |
| 1 | 1 | 0 |
| 1 | 0 | 1 |
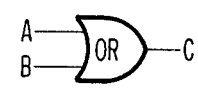
$C = A + B$
| A | B | C |
|---|---|---|
| 0 | 0 | 0 |
| 0 | 1 | 1 |
| 1 | 1 | 1 |
| 1 | 0 | 1 |
$C = \overline{A + B}$
| A | B | C |
|---|---|---|
| 0 | 0 | 1 |
| 0 | 1 | 0 |
| 1 | 1 | 0 |
| 1 | 0 | 0 |

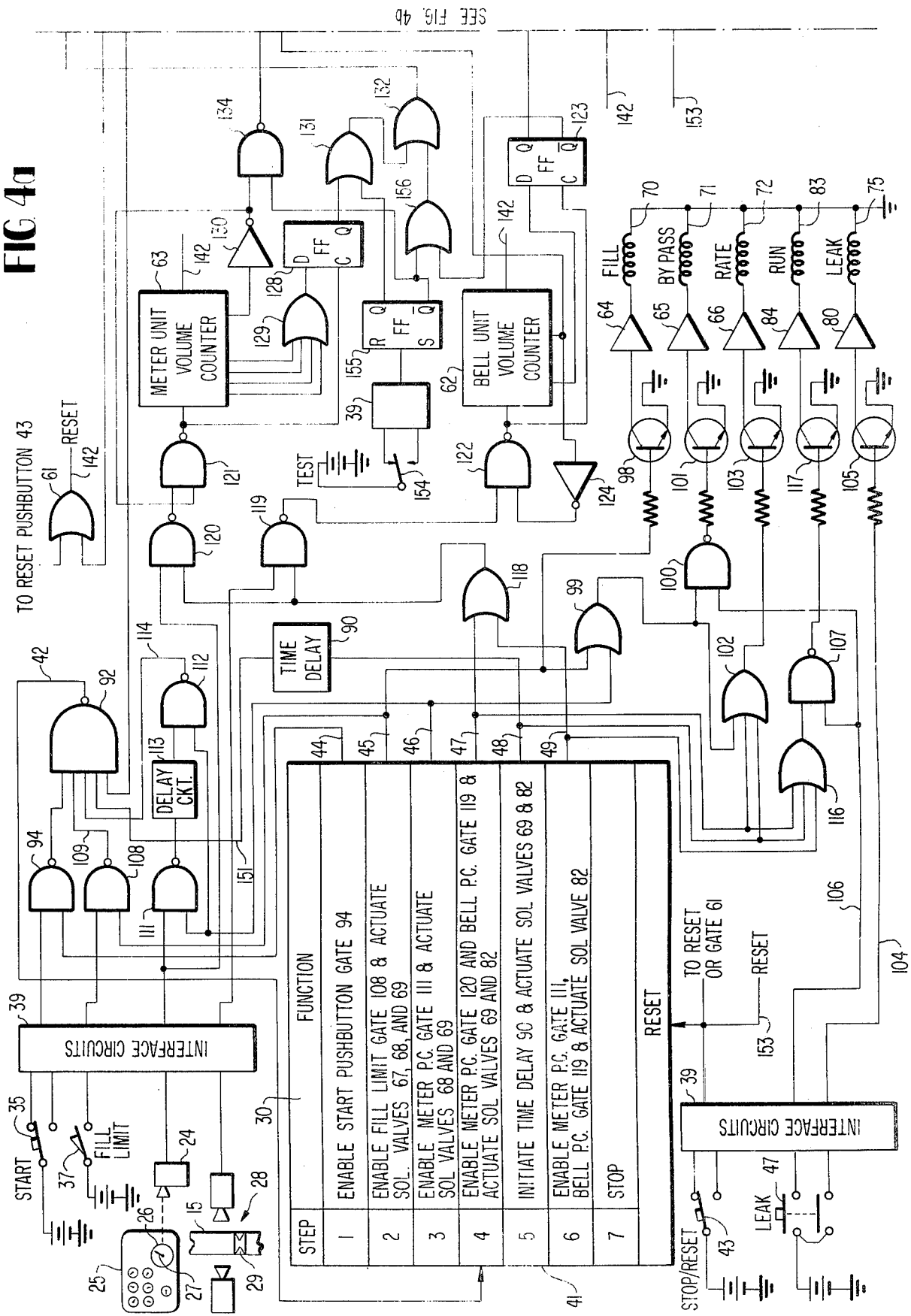

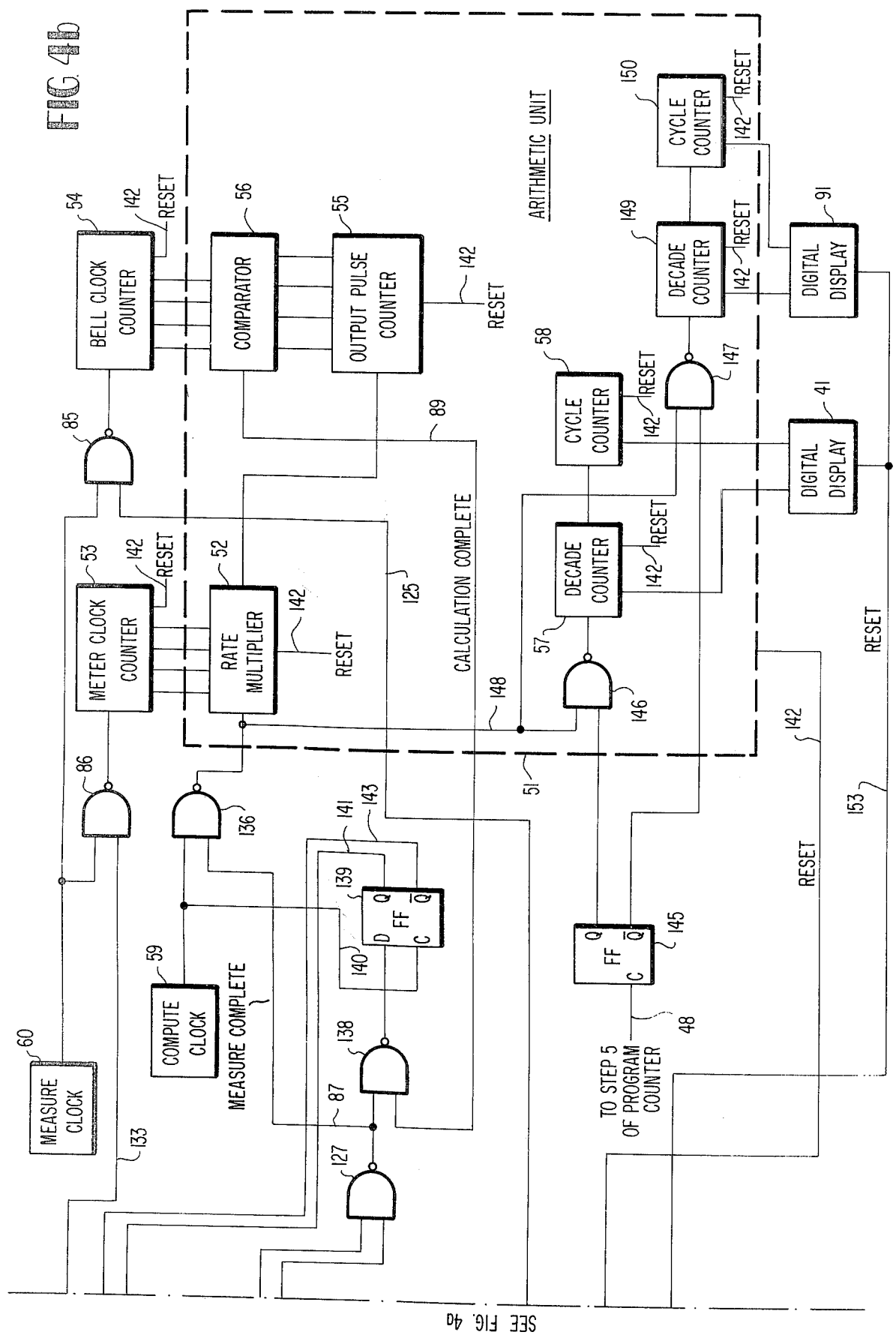

APPARATUS AND METHOD FOR PROVING METERS

BACKGROUND OF THE INVENTION

Typically in the method of testing gas meters, air from a proving bell is passed through a meter until a unit volume is measured by the meter. The proving bell is stopped and the calibration is accomplished by comparing the known volumn passed from the proving bell to the meter reading. The meter accuracy, expressed as Percent Proof, is the ratio of the actual volume indicated by the position of the prover bell to the registered volume shown on the meter index. Generally the calibration is performed at 100 percent of rated meter flow and at 20 percent of the rated meter flow.

Prior art relating to this method of testing gas meters, utilize various mechanical attachments to the prover bell and/or meter to provide an indication of the small incremental volumes by which the prover bell and meter differ when the proving bell is stopped. The attachments to the meter and bell actuate various electro-mechanical circuits to operate solenoid valves to take the prover bell and meter through a proving cycle. The more sophisticated art involves the attachment of a potentiometer to the prover bell wheel shaft to provide an analog signal indicative of bell position. The mechanical attachment of the potentiometer to the prover wheel shaft has been shown to develop a mechanical set making it difficult to mechanically adjust. The analog circuitry associated with the potentiometer has been generally shown to have a tendency to drift electrically because of aging and/or temperature changes so that their accuracy is poor, requiring frequent calibration.

It is commonly accepted in the proving of meters that for meters operating at a constant rate of flow, time may be used to indicate the volume that the meter is measuring. The time required to measure a unit volume of a prover bell operation at a constant rate of flow, and the time to measure a unit volume of a meter connected to the prover bell may be substituted for volume in the calibration equation:

$$\% \text{ PROOF} = \frac{\text{VOLUME OF PROVER BELL}}{\text{VOLUME OF METER}} \times 100$$

SUMMARY

Briefly, this invention comprises a practical digital calculator and method capable of operating and controlling a prover bell, while at the same time providing greater accuracy and repeatability in the testing or proving of gas meters. The present invention is illustrated but not limited to an embodiment in which a digital electronic calculator is pre-wired to calculate the accuracy of a domestic gas meter connected to a five cubic foot prover bell, the calculator receiving electrical signals representing predetermined unit volumes as increments of the time measured by the gas meter and by the prover bell, and calculating the accuracy of the gas meter in terms of Percent Proof to an accuracy of about one part in one thousand. More specifically, the present embodiment controls a proving cycle in which a domestic gas meter, with an index equipped with a one-half foot proving pointer, is automatically tested for accuracy at two different flow rates, the results being stored and visually displayed as Percent Proof.

The calculator utilizes optical means to give a measure of unit volume from the prover bell and meter thereby avoiding mechanical attachments to the moving parts of the prover bell or meter. Problems of mechanical friction and binding are thus eliminated and the meter operates under its normal running condition. The invention also provides a prover calculator that is additionally self checking as well as one that controls the prover bell and meter in such a fashion so as before and after the unit volumes of the prover bell and gas meter are measured, all valves connected to the prover bell and meter have operated and the prover bell and meter are operating at a constant flow rate. Thus the gas meter is proved at actual operating conditions.

BRIEF DESCRIPTION OF THE DRAWINGS

FIGS. 1A–1B disclose a composite electrical-mechanical diagram illustrative of the present invention;

FIG. 2 is an electrical block diagram illustrative of the arithmetic unit utilized for performing the calculations;

FIG. 3 is a chart illustrative of a simple calculation performed by the arithmetic unit;

FIGS. 4A–4B illustrate a detailed electrical block diagram of the embodiment of FIG. 1 being further illustrative of the logic control circuitry; and FIG. 5 is a diagram helpful in understanding the binary logic elements utilized by the subject invention.

DESCRIPTION OF THE PREFERRED EMBODIMENT

Figure 1B:
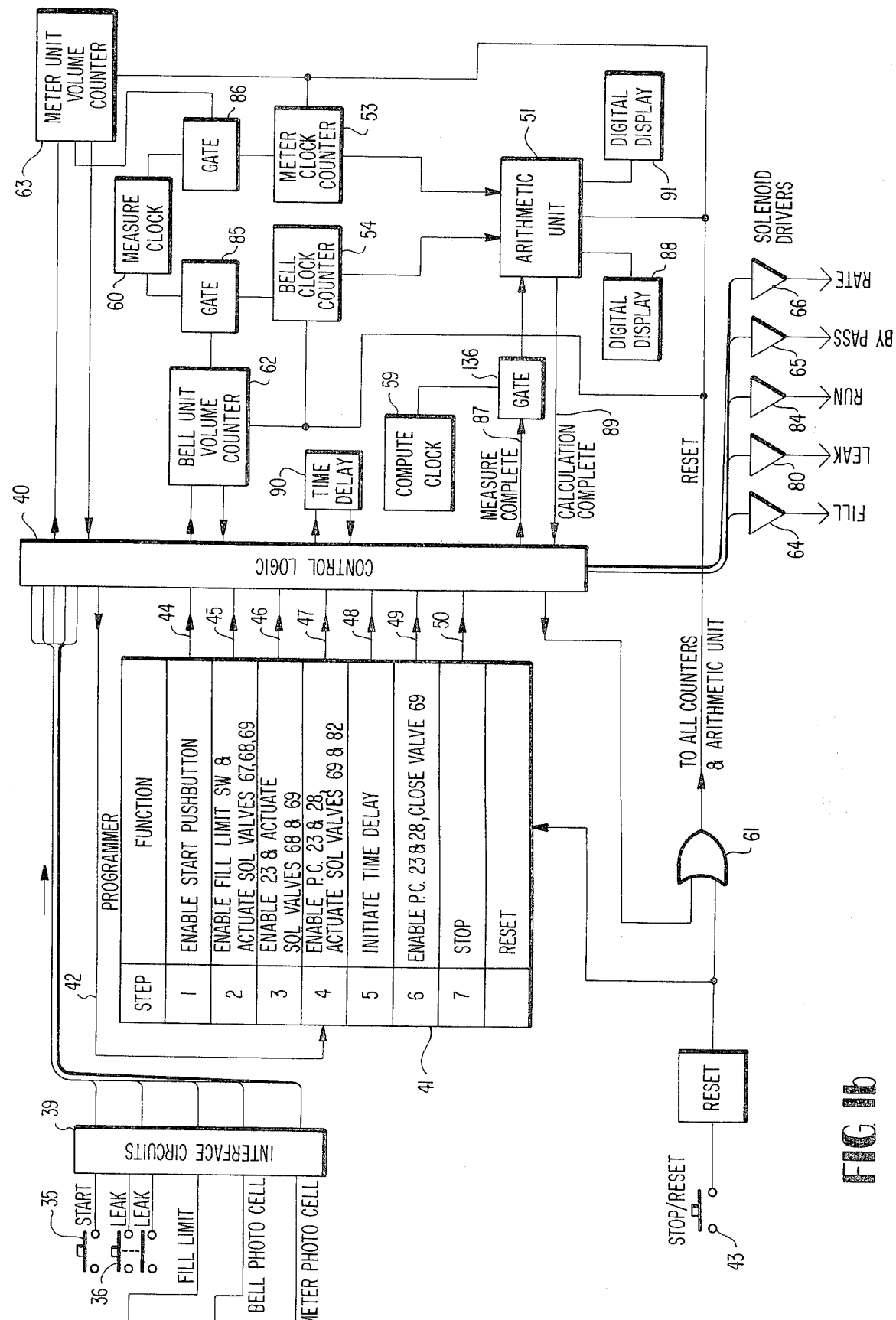

The prover bell, associated piping and solenoid valves used with the present invention is typical of meter proving systems. Referring now to FIGS. 1A & 1B, the system comprises a tank or tub 10 having a bell 11 mounted therein for vertical movement. The space 12 between the tank and bell is filled with a fluid, such as oil, and the tank has connected thereto a pipe 13 through which air can be evacuated from the bell or admitted to the bell from the meter 14 under test as will be explained later. The bell has a scale 15 on the surface to indicate the volume of air in the bell in the various positions thereof. As the bell 11 is evacuated of air, it drops vertically and is guided in its vertical movement by rollers 16 mounted on the top of the bell and cooperating with the guide rails 17 disposed above the tank. A counterweight 18 is connected by a cable 19 to the top of the bell, which cable passes over a wheel 20 mounted on an upper platform 21 disposed over the bell.

The gas meter 14 to be proved is connected to input pipe 22 and output pipe 23. A retro-reflective photoelectric scanner 24 is directed onto the meter index 25 so that a spot of light from a light source within the scanner will fall on the white plate 26 of the 0.5 cu. ft. meter index and be cut by the revolving pointer 27 each time the pointer revolves. The change in intensity of light reflected from the index when the dark colored pointer is cutting the light beam will be sensed by a photoelectric amplifier incorporated in the scanner 24 to perform various digital functions described later.

Mounted on the tank 10 is a light source and photocell assembly 28 of standard design mounted in such a fashion that the light source is directed at the photocell.

As the bell 11 is evacuated or filled with air, flags 29, 30, 31 and 32 graduated to read volume interrupt the beam of light to the photocell assembly 28. The light interruptions will be sensed by the photocell to produce an electrical pulse signal coupled to circuit lead 34 for causing various digital functions as will also be described later.

External control elements mounted on the frame supporting the wheel 20 for the calculator such as manually operable START and LEAK pushbutton switches 35 and 36, a fill limit switch 37 and photoelectric output signals appearing on leads 34 and 38 are connected to the calculator through suitable interface circuits generally designated by reference numeral 39. These circuits provide signal conditioning to provide reliable signal levels compatible with state of the art electrical binary digital logic circuit elements. They may be of various types well known to the art such as R-S flip-flops or optically coupled isolators such as a Monsanto type MCT2. The interface circuits 39 of the external control elements are connected to a control logic section 40 comprises of a plurality of AND, NAND, OR and NOR logic gates, to be considered in detail subsequently such that predetermined control signals are selected at the appropriate time in accordance with the operation of a counter type programmer 41 per an indexing pulse applied on the circuit lead 42. At all other steps in the program the external control elements are disabled with the exception of the STOP/RESET pushbutton switch 43 which may be activated to shutdown the proving cycle at any time. The programmer 41 consists of a decade counter having a plurality of output leads 44 through 50 connected to the control logic section 40 such that a count at the resepective output leads activates selected logic gates (FIGS. 4A–4B) in the control logic section 40 to permit signals generated either externally or internally of the calculator to perform the function designated. At the completion of each function the control logic increments i.e. indexes the programmer 41 to generate output signals for performing the next designated function.

The digital arithmetic required in the illustrated embodiment of this invention is performed in an arithmetic unit 51 which includes a binary coded decimal (BCD) rate multiplier 52 shown in FIG. 2. This is a standard well known digital integrated circuit, a typical example being Motorola type 14527. The characteristics of this type of circuit is such that the number of output pulses is a product of a BCD input number and a selected number of input pulses. For example if 2 is the BCD input number, there will be two output pulses for every ten input pulses, ten input pulses constituting one complete cycle.

Expressed algebraically:

$$\text{OUTPUT PULSES} = \text{CYCLES} \times \text{BCD INPUT NUMBER} \quad (1)$$

Simple digital arithmetic may be performed by arranging and interconnecting BCD counters for the parameters in the above expression. For the application required in this embodiment, division may be accomplished by re-arranging the expression to read:

$$\text{CYCLES} = \frac{\text{OUTPUT PULSES}}{\text{BCD INPUT NUMBER}} \quad (2)$$

Referring now to FIG. 2, which is partially illustrative of the arithmetic unit 51, the BCD input number to the rate multiplier 52 is provided by a meter clock counter 53. The BCD counters comprising the bell clock counter 54 and output pulse counter 55, together with comparator 56 comprise the numerator of the expression set forth in equation (2). The decade counter 57 and the cycle counter 58 serve to store the quotient. With BCD numbers representing measured volumes stored in meter clock counter 53 and bell clock counter 54, division is accomplished by cycling the rate multiplier 52 with clock pulses from a compute clock oscillator 59, until the output pulses recorded in output pulse counter 55 equal the number stored in bell clock counter 54. The quotient, or number of cycles, is stored in the cycle counter 58, with the remainder stored in the decade counter 57. In order to more fully understand this operation, FIG. 3 is a tabulation of a simple division of six divided by two wherein a BCD number 6 is stored in the bell clock counter 54 and BCD number 2 being stored in the meter clock counter 53. Cycling the rate multiplier 52 until equivalence occurs in the comparator 56 results in the quotient of 3 stored in cycle counter 58.

For simplicity only a single stage of the arithmetic unit 51 is illustrated in FIGS. 2 and 4. For the accuracy required by this embodiment, the resolution of the measurements is increased by incorporating for example five identical stages. The frequency of a measure clock oscillator 60, typically 120Hz, is such that in the period during which a unit volume is being measured, at least four digit numbers are recorded in the bell and meter clock counters 54 and 53.

Referring back now to FIG. 1, operation is initiated by activating the stop-reset pushbutton 43 effecting a reset signal to clear to step 1 of the programmer 41 and a reset signal through OR gate 61 to clear to zero a bell unit volume counter 62, the prover bell clock clunter 54, a meter unit volume counter 63, the meter clock counter 53 and the arithmetic unit 51. Step 1 of the programmer 41 enables the START pushbutton switch 46. Actuating the START switch 35 increments the programmer 41 to step 2. With the programmer's count in step 2, the fill limit switch 37 is enabled and concurrently the control logic section 40 activates solenoid driver circuits 64, 65, and 66 for operating the fill valve 67, the by pass valve 68 and the rate valve 69. Solenoids 70, 71 and 72 connected to these drivers open the respective valves causing the vacuum source not shown connected to pipe 73 to evacuate prover bell 11 through pipes 74 and 13. The prover bell 11 begins to drop vertically into the tub 10. The by pass and rate valves 68 and 69 being open while the leak valve 76 is normally open, the same vacuum source causes meter 14 to operate through pipes 73, 76, 77, 78, 23, 22 and 79.

Leak test pushbutton 36 is mechanically arranged in such a way that one set of contacts operates before the other. The first set of contacts is adapted to close leak valve 76, sealing off pipe 79 from atmosphere. A negative pressure is developed within the meter 14, as measured by manometer 81. Depressing LEAK test pushbutton 36 to the end of its travel operates the second set of contacts within the switch which is adapted to deenergize the by pass solenoid 68 causing the by pass valve 68 to close. A negative pressure is now trapped in meter 14 by the run valve 82, the by pass valve 68 and the lead valve 76 all of which are closed. Should a leak be present in the meter or in the connections of pipe 22 and 23 to the meter, the manometer 81 will measure the return of the interior of the meter to atmospheric pressure. Should the manometer 81 indicate no leak, the LEAK test button 36 is released, and valves 68, 69, and 76 open and the meter 14 again begins to operate.

Still under control of step 2 of the programmer 41 the bell 11 continues to be drawn down into the tub 10 by the vacuum source until fill limit switch 37 mounted on the wheel frame is operated by pawl 83 mounted on the prover wheel 20. The pawl 83 is adjusted to operate the limit switch 37 at approximately the zero volume point on scale 15. The operation of fill limit switch 37 now increments the programmer 41 to step 3. Continued to be operated by step 3 by way of the control logic section 40 are the solenoids 71 and 72 for the by pass valve 68 and rate valve 69. No longer activated, however, is fill valve 67. The bell 11 thus halts its travel but the meter 14 continues to run. Also activated by step 3 is the meter photoscanner 24. At the first interruption of the light beam of the photoscanner by the pointer 27 of meter index 26, the programmer 41 is incremented to step 4.

Considering now step 4, the by pass valve 68 is closed while the run and rate solenoid valves 82 and 69 are opened by means of the control logic section 40. The run valve is actuated by the solenoid 83 coupled to the driver 84. The bell 11 now starts to rise being lifted by counterweight 18 and cable 19 looped around the prover wheel 20. Air is thus drawn into the bell through pipe 13, run valve 82, rate valve 69, pipes 77 and 78, pipe 23, meter 14, pipe 22, leak valve 76 and pipe 79. The meter and prover bell are now connected in series and are operating together. Also activated by step 4 is a logic gate, not shown, coupled to the meter photoscanner 24 which will be sensitive to the second light interruption from the index pointer 27. Activated also by step 4 is another logic gate, not shown, sensitive to the first light interruption of the bell photocell system 28 caused by flat 29 mounted on the prover scale 15.

The distance between the point on the scale 15 at which the bell reaches its lowest or filled point and hence the pawl 83 strikes the fill limit switch 37, and the flag 29 corresponds approximately to one revolution of the meter index pointer 27 being sensed by the meter photoscanner 24, i.e. 0.5 cubic feet. Consequently as the bell 11 begins to rise again due to the signal generated by the first light interruption from the meter index pointer, the second light interruption by the meter index pointer 27 and the light interruption from flag 29 upon the prover bell photocell system 28 will occur substantially simultaneously. The signal on circuit lead 34 from the bell photosystem 28 is gated during step 4 to the bell unit volume counter 62. Gated also by step 4 is the first signal to occur in step 4, from the meter photoscanner 24 and appearing on circuit lead 38 to the meter unit volume counter 63. Upon receiving the first count of the unit volumes of which they are to measure, logic gates 85 and 86 coupled to the measure clock oscillator 60 permit clock pulses from the oscillator to enter the bell clock counter 54 and the meter clock counter 53. Clock pulses continue to enter the clock counters 54 and 53 until the unit counters 62 and 63 have determined that unit volumes of two cubic feet have been measured. For the bell unit counter 62 this occurs when flag 30 interrupts the bell photocell assembly 28 and disables logic gate 85. For the meter unit counter 63 four interruptions of the pointer 27 following the initial zero interruption will result in two cubic feet being measured. With both unit counters having determined that unit volumes (2.0 cubic feet) have been measured, a MEASURE COMPLETE signal is generated by the control logic section 40 and carried to the arithmetic unit 51 on line 87.

The arithmetic unit 51 now calculates the ratio of prover bell 10 volume to the meter 14 volume from the date stored in the counters 54 and 53 respectively. At the completion of the calculation the result is stored and displayed on the display 88. The arithmetic unit 51 generates a CALCULATION COMPLETE signal which appears on line 89. This signal is carried to control logic section 40 and through OR gate 61 to reset the arithmetic unit 51 and clear to zero all counters with the exception of the programmer 41 and the visual display 88. The calculation complete signal also causes the programmer 41 to be incremented to step 5.

Step 5 of the programmer initiates an adjustable time delay be means of the time delay circuit 90. This time delay is to permit the meter 14 to operate at 100 percent of its rated flow rate for almost one complete revolution of the meter index pointer 27. At the completion of the desired time delay, a signal is generated and fed back to the control logic section 40 and the programmer 41 is incremented to step 6.

Step 6 continues to operate the run valve driver 84 but deactivates the rate valve 69. Air drawn through the meter 14 by the prover bell now is restricted by the orifice 91 located in pipe 78 to approximately 20 percent of the meters rated capacity. Step 6 also reactivates prover photocell assembly 28 and the meter photocell assembly 24. The bell unit counter 62 and meter unit counter 63 are prepared to receive the first pulse generated by the light interruptions caused by flag 31 and the meter index pointer 27 of the gas meter 14. Each unit volume counter upon receiving its first pulse activates its respective gate and clock pulses begin to enter the clock counters 53 and 54 as before. As in step 4, the measure cycle continues until unit volumes have been measured, this being determined by the light beam of the prover bell photocell assembly 28 being interrupted by flag 32 and the meter index pointer 27 having made sufficient revolutions to equal the same unit volume measured by the prover bell. The completion of the measure cycle as determined by the unit counters 62 and 63 again generates a MEASURE COMPLETE signal on line 87 to the arithmetic unit 51. As in step 4, the arithmetic unit 51 again calculates the ratio of prover volume to meter volume from the data stored in clock counters 54 and 53, respectively. The result of the calculation is stored and displayed on the digital display 91. At the completion of this calculation, a signal is generated on line 89 to increment the programmer 41 to step 7. A reset signal is generated in the control logic section 40 and applied through OR gate 61 to reset the arithmetic unit 51 and clear to zero all counters except the programmer 42 and the digital displays 88 and 91. Step 7 of the programmer 41 constitutes the STOP position. The prover bell and meter 14, however, maintain their position since solenoid drivers 64, 84 and 65 are not operated and therefore the respective valves are closed. The operator then removes the meter 14 from pipes 22 and 23 and either adjusts or approves the meter based on the results displayed on visual displays 88 and 91.

Referring now to FIGS. 4A & 4B and again following through a complete cycle of operation but in greater detail, in order to illustrate the control logic section comprised of the four basic types of binary logic gates (AND, NAND, OR and NOR) shown in FIG. 5, the cycle begins with an output generated by depressing STOP/RESET pushbutton 43. The reset signal so generated resets the current of the programmer 41 to step 1. The reset signal is also applied through OR gate 61 to clear to zero the rate multiplier 52, visual displays 88 and 91, and all counters 53, 54, etc. The five inputs of NAND gate 92 are normally in a binary 1 condition. Should any input change from binary 1 to binary 0, the output of the gate appearing on lead 42 coupled to the programmer 41 will change from 0 to 1 incrementing the count of the programmer. NAND gate 94 is enabled by 1 from the step 1 output appearing on lead 44 from the programmer 41. Depressing START pushbutton 35 causes a 1 appearing on lead 96 to be applied to the second input of NAND gate 94. The output of gate 94 will fall to 0 and the output of NAND gate 92 will change from 0 to 1, stepping the programmer to step 2. The 1 condition on the step 2 output lead 45 is applied to the base of transistor 98 causing the transistor to conduct and activate the solenoid driver 64. Connected to solenoid driver 64 is the fill valve solenoid 70. With the solenoid driver activated, 120 volts, not shown, is applied to the solenoid causing it to operate. Solenoid driver 64 is typical of all the solenoid drivers 64 . . . 80 used in this embodiment. It is an optically coupled solid state relay of standard design available from several manufacturers, a typical example being the Monsanto type MSR100.

The 1 condition of the step 2 output lead 45 is also applied through OR gate 99 to the AND gate 100 where output is coupled to the base of transistor 101. With transistor 101 conducting, solenoid driver 65 is turned on, which in turn operates by pass valve solenoid 71. The 1 condition appearing on the output of OR gate 99 due to the step 2 output is also applied through a three input OR gate 102 whose output is applied to the base of transistor 103, turning on transistor 103 and the solenoid driver 66 connected to it. The rate valve solenoid 72 is operated by the solenoid driver 66. As described earlier, the prover bell (FIG. 1) beings to drop vertically into the tub 10. The fill, by pass and rate solenoid valves 67, 68 and 69 being operated, and with the leak valve 76 being normally open, the vacuum source coupled to pipe 73 causes meter 14 under test to operate.

The operator of the prover bell next checks the meter 14 and connections for leaks by depressing the LEAK pushbutton 36. As noted earlier, LEAK test pushbutton 36 is mechanically arranged such that one set of contacts operates before the other. In actuating the pushbutton 36, the first operated set of contacts, through interface circuit 39 causes the condition of lead 104 and the base of transistor 105 to which it is connected, to change from 0 to 1. The transistor conducts activating solenoid driver 80, operating leak valve solenoid 75 for sealing off pipe 79 from atmosphere. A negative pressure is developed within the meter as measured by manometer 81 shown in FIG. 1. Depressing LEAK test pushbutton 36 to the end of its travel operates a second set of contacts within the switch causing the condition of lead 106 to change from 1 to 0 disabling AND gates 100 and 107. With the programmer 41 in step 2, disabling AND gate 100 will cause the bypass valve solenoid 71 to deenergize. A negative pressure is now trapped in meter 14 by the normally closed run valve 82, the deactivated bypass valve 68 and the closed leak valve 76. Should a leak be present in the meter 14 or in the connections of pipes 22 and 23 to the meter, the manometer 81 will measure the return of the interior of the meter to atmospheric pressure. Should the manometer 81 indicate no leak, the LEAK test pushbutton 36 is released. Valves 82, 68 and 76 open and the meter 14 again begins to operate. In steps 4, 5 or 6, the run valve solenoid 83 is normally operated opening the valve 82 while the bypass solenoid 71 is deenergized closing the valve 68. Should the LEAK test pushbutton 36 be depressed with the count of the programmer 41 in either of the three steps, the leak solenoid 75 is energized, AND gate 107 is disabled deenergizing the run solenoid 83 thereby trapping the negative pressure within the meter.

Under the control signal of step 2, the bell 11 continues to be drawn down into the tub 10 by the vacuum source until fill limit switch 37 is operated by pawl 83 mounted on the prover wheel 20. NAND gate 108 is enabled by the 1 condition of step 2. The 1 condition produced by the closure of fill limit sweitch 37 causes the output of NAND gate 108 to fall from 1 to 0. This condition being coupled to NAND gate 92 by lead 109 causes the output of gate 92 to rise from 0 to 1 and the programmer 41 is indexed to step 3 by the transition of 0 to 1 at the output of gate 92. The binary 1 signal is removed from the base of 98, fill valve solenoid 70 is deenergized, and the bell 11 halts its downward movement into the tub. Step 3 of the programmer 41 continues to operate bypass valve solenoid 71 with a 1 condition applied to the base of transistor 101 via OR gate 99 and enabled AND gate 100. The rate valve solenoid 72 also continues to be operated, the base of its associated driver transistor 103 having a 1 from step 3 output lead 46 applied through OR gates 99 and 102. The meter 14 continues to run. Also enabled by the binary 1 signal of step 3 is NAND gate 111 and 112. Connected to the second input of NAND gate 111 is meter photoscanner 24. When the light beam from the photoscanner 24 is interrupted by the revolving pointer of meter index 26, a binary 0 to 1 transition is generated via the interface circuitry 39 to NAND gate 111. The output of gate 111 changes from 1 to 0 and is coupled to the time delay circuit 113. However, time delay circuit 113 is sensitive to 0 to 1 transition only and no change takes place on the delay circuit output. As the index pointer rotates output of the light beam, the input to delay circuit 113 changes from 0 to 1 , causing the output to change from 0 to 1. The 1 condition applied to enabled NAND gate 112 is connected via lead 114, is disabled by the 0 input, causing the output to rise from 0 to 1 and incrementing the programmer 41 to step 4. In accordance with the step 4 output signal appearing on lead 47, the bypass valve solenoid 71 is no longer activated.

The 1 condition of the step 4 signal on lead 47 is applied through OR gate 102 to the base of transistor 103 keeping the transistor on and with it the associated rate valve solenoid 72. Step 4 also actuates the run valve solenoid 83 by applying the binary 1 signal through OR gate 116, enabled AND gate 107 to the base of transistor 117 turning it on as well as its associated solenoid 83. The bell 11 now starts to rise being lifted by counter weight 18 and cable 19 looped around the prover wheel 20. Air is thus drawn into the bell through pipe 13, run valve 82, rate valves 69, pipes 77 and 78, pipe 23, meter 14, pipe 22, leak valve 76, and pipe 79. The meter 14 and prover bell are now connected in series or tandem and are operating together. The binary 1 signal of step 4, applied through OR gate 118 will enable NAND gates 119 and 120. Gate 120 will therefore pass signals generated by meter photoscanner 24 to NAND gate 121. Similarly gate 119 will pass signals generated by bell photocell assembly 28 to NAND gate 122.

Step 4 of the programmer 41 initiates the actual measurement cycle in which clock pulses relating to a two cubic foot unit volume as measured between flags 29 and 30 (FIG. 1) of the prover bell, and a two cubic foot unit volume as measured by four revolutions of the one-half cubic foot pointer 27 on the meter index 26 of the meter 14 are recorded and calculated. Bell unit volume counter 62 has been reset to zero by the initial actuation of STOP/RESET pushbutton 43. The 0 output terminal of the counter therefore presents a binary 1 to the "D" input terminal of flip-flop 123. It is the nature of a D type flip-flop to transfer to the "Q" output terminal the date present at the D input upon a binary 0 to 1 transition of the input applied to input terminal "C." Terminal 2 of the counter 62 is a binary 0. This condition is inverted by the logic inverter 124 to a 1 and presented to NAND gate 122 enabling the gate for pulses from the bell photocell system 28 via enabled NAND gate 119. The first pulse effected by flag 29 causes the output of NAND gate 122 to change from 0 to 1. This transition increments the bell unit volume counter 62 to "one" and changes the Q output condition of flip-flop 123 from 0 to 1. The Q output terminal of flip-flop 123 is coupled via lead 125 to AND gate 85. With the Q terminal at 1, AND gate 85 is enabled and pulses from measure clock oscillator 60 pass through the gate to be counted by bell clock counter 54. With one count from flag 29 recorded in the bell unit volume counter 54, the O terminal of the bell unit volume counter 62 presents a 0 condition to the D input of flip-flop 123. As the bell continues to rise, flag 30 next produces a pulse causing the output of NAND gate 122 to again rise from 0 to 1. The binary 0 present at the D input of flip-flop 123 is transferred to the Q output thereof. This condition, being coupled to AND gate 85, inhibits the gate to further pulses from the measure clock oscillator 60. With two counts now in the bell unit volume counter 54, the 2 terminal of the counter 62 is at a 1. This condition is inverted by inverter 124 and coupled to NAND gate 122 inhibiting the gate to further pulses from the bell photo system 28. The binary 1 condition at the 2 terminal is also presented to AND gate 127, signifying that the prover bell two cubic foot unit volume has been measured.

Meanwhile, meter unit volume counter 63 has also been reset to zero by the initial actuation of STOP/RESET pushbutton 43. The 0 terminal therefore exhibits a binary 1. The 0, 1, 2 and 3 terminals of the meter unit volume counter 63 are presented to the D input terminal of flip-flop 128 through OR gate 129. The 5 terminal of the counter 63 is at 0. This logic condition is inverted by inverter 130 to a 1 and applied to NAND gate 121, enabling the gate to pass pulses from the meter photoscanner system 24 via enabled NAND gate 120. The first pulse effected by the index pointer 27 causes the output of NAND gate 121 to change from 0 to 1. This transition indexes the meter unit volume counter 63 to "one" and changes the $\overline{Q}$ output of flip-flop 128 from 1 to 0. The binary 0 condition of the $\overline{Q}$ output of flip-flop 128 produces a 1 on the output of enabled NOR gate 131. The 1 condition is passed through OR gate 132 to enabled AND gate 86. Pulses from measure clock oscillator 60 pass through AND gate 86 to be counted by meter clock counter 53. The first pulse from the meter photoscanner 24 to meter unit volume counter 63 and from the bell photo system 28 to the bell unit volume counter 62 occur approximately at the same time. After one and one-half cubic feet have passed through the meter 14, four counts will be in the meter unit volume counter 63. The D input of flip-flop 128 will be at 0. Upon the counter receiving the fifth pulse, two cubic feet will have been measured by the meter 14, and the 0 to 1 transition at the C input of flip-flop 128 will change the condition of $\overline{Q}$ from 0 to 1. The binary output of NOR gate 131 will change from 1 to 0 thereby inhibiting AND gate 86 to further pulses from measure clock oscillator 60. With five counts now in the meter unit volume counter 63 the 5 terminal will exhibit a binary 1. This condition is inverted by inverter 130 to a binary 0 which inhibits NAND gate 121 to further pulses from the meter photoscanner 24. This same 0 condition also inhibits NAND gate 134 causing its output to rise to a 1 signifying that the meter unit volume has been measured.

With both two cubic foot unit volumes having been respectively measured by the bell unit volume counter 62 and by the meter unit volume counter 63, the output of AND gate 127 will be a binary 1 signifying MEASURE COMPLETE. This binary signal is applied via circuit lead 87 to enable AND gate 136 in the arithmetic unit 51. Pulses from the compute clock oscillator 59 operating at typically an 800KHz rate pass through AND gate 136 to the rate multiplier 52 and the calculation of the accumulated data begins as described earlier. At the completion of the calculation, a binary 1 occurs on circuit lead 89 signifying a CALCULATION COMPLETE. NAND gate 138 is now enabled by the binary 1 signal on the MEASURE COMPLETE lead 87 and the 1 on CALCULATION COMPLETE lead 89. The output of NAND gate 138 now presents a 0 to the D input of D-type flip-flop 139. The continuous train of pulses at the C input of flip-flop 139 from compute clock 59 applied via lead 140 immediately transfers the binary 0 from the D input of the flip-flop to its Q output. The 0 condition of the Q output of flip-flop 139 is coupled by means of circuit lead 141 to NAND gate 92 causing the output of the gate to rise from 0 to 1. This transition increments programmer 41 to step 5.

With the Q output of flip-flop 139 at 0, $\overline{Q}$ will be at 1. This condition is applied as a reset signal through OR gate 61 to all counters and registers with the exception of the programmer 41. With meter unit volume counter 63 and bell unit volume counter 62 reset to zero, the signal on the MEASURE COMPLETE lead 87 is a 0 inhibiting NAND gate 138 and causing its output to rise to a 1. This 1 condition coupled to the D input of flip-flop 139 will be immediately transferred to the Q output by the continuous pulse train from the compute clock 59 being applied to the C input of flip-flop 139. The output of NAND gate 92 then returns to 0. The reset line 142 is also at 0, it being connected via OR gate 61 to the $\overline{Q}$ output of flip-flop 139 by means of circuit lead 143. The 0 to 1 transition of the step 5 output signal from the programmer 41 appearing on circuit lead 48 reverses the Q and $\overline{Q}$ output of flip-flop 145 inhibiting AND gate 146 and enabling AND gate 147. Pulses from the compute clock 59 appearing on circuit lead 148 thus may enter the cycle counter 150 for the second run computation.

Continued to be energized by the 1 of step 5 signal are rate valve solenoid 72 via OR gate 102, and run valve solenoid 83 via OR gate 116 and enabled AND gate 107. The prover bell 11 thus continues its upward travel and the meter 14 continues to run. With the programmer 41 in step 5, the adjustable time delay 90 (FIG. 1) is initiated by the binary 1 signal of step 5. This time delay is to permit the meter 14 to operate at the 100 percent flow rate for almost one complete revolution of the meter index pointer 27 before the flow rate is reduced to 20 percent of rated meter flow for the second calibration. At the completion of the time delay the output on circuit lead 151 from the adjustable time delay 90 will fall from 1 to 0. Being connected to NAND gate 92 this transition will cause the output of the gate 92 to rise from 0 to 1 and increment programmer 41 to step 6.

Step 6 continues to operate solenoid 87 for the run valve 82 but releases the rate valve 69 which closes. Air drawn through the meter 14 by the prover bell now is restricted by the orifice 91 located in pipe 78 to approximately 20 percent of the meter's rated capacity. As in step 4 the measurement cycle is again initiated. OR gate 118 also having an input of the step 6 output signal appearing on circuit lead 49 and performing the OR function from step 4 or step 6, will enable NAND gate 119 and NAND gate 120. Gate 120 will therefore pass signals generated by meter photoscanner 24 to NAND gate 121 and gate 119 will pass signals generated by bill photocell system 28 to NAND gate 122. The completion of the measure cycle as determined by the unit volume counters 62 and 63 again generates a MEASURE COMPLETE signal on lead 87 to enable AND gate 136. Pulses from the compute clock 59 pass through AND gate 136 to the rate multiplier 52 and the calculation of the accumulated data begins. At the completion of the calculation a 1 occurs on line 89 signifying a CALCULATION COMPLETE. As in step 4 the programmer 41 is incremented, this time to step 7 which is the stop position, and all counters except the programmer 41 and the digital displays 88 and 91 are reset to zero. The displays receive separate reset signals via circuit lead 153.

A "self-checking" feature is also included to determine if the arithmetic and control units are functioning properly. Operation of a COMPUTE-TEST switch 154 transfers the meter clock counter 53 from the control of the meter unit volume counter 63 to the bell unit volume counter 62. Therefore at the completion of a unit volume measurement cycle the contents of the meter clock counter 53 and the bell clock counter 54 are identical and the arithmetic unit will calculate a quotient of one, with the digital display showing 100 percent Proof. With switch 154 in the "test" position the Q output of flip-flop 155 is at 1 and the $\overline{Q}$ output is a binary 0. NOR gate 131 is coupled to the Q output and is therefore disabled to any lever changes originating from flip-flop 128 and meter unit volume counter 63. With the $\overline{Q}$ output of flip-flop 155 coupled to NOR gate 156, at a binary 0, NOR gate 156 is enabled to level changes which might occur from flip-flop 123 and bell unit volume counter 62. Accordingly with the programmer 41 in step 4 or step 6, the first pulse effected by flag 29 or flag 31 will change the condition of flip-flop 123 to a "1" on the Q output and a "0" on the $\overline{Q}$ output. A binary "0" on the $\overline{Q}$ output of flip-flop 123 will produce a "1" on the output of NOR gate 156. This 1 condition applied through OR gate 132 will enable AND gate 86 and clock pulses from measure clock 60 will begin to enter meter clock counter 53. Simultaneously the 1 condition of the Q output of flip-flop 123 will enable AND gate 126 and clock pulses from measure clock 60 will begin to enter bell clock counter 54. Clock pulses from measure clock 60 will continue to enter meter clock counter 53 and bell clock counter 54 until a unit volume has been measured from the prover bell. With the programmer 41 in step 4 or step 6, this will occur as flag 29 or 32 passes through bell photocell system 28.

The output of NAND gate 134 is at 1, the gate being disabled by the "0" of the $\overline{Q}$ output of flip-flop 155. The 1 of the output of NAND gate 134 is applied to AND gate 127. With a unit volume having been measured, the 2 lead of bell unit volume counter 62 is at 1. This condition is coupled to AND gate 127 enabling the gate and signifying MEASURE COMPLETE on line 87. As before, the 1 on line 87 enables AND gate 136, whereupon pulses from the compute clock 59 pass through gate 136 to the rate multiplier 52 and the calculation of the accumulated data begins. With the data accumulated in meter clock counter 53 and bell clock counter 54 being identical, the calculation will result in a quotient of 1.0. Should there be a malfunction in any of the circuit elements comprising the measuring, control or arithmetic units the quotient will be something other than 1.0 and circuit checks may be initiated by the operator.

Thus basically what has been shown and described is a digital system for proving gas meters and the like whereupon the initiation of a proving cycle, independent photocell assemblies 24 and 28 for the meter under test 14 and a standard (prover bell), respectively, are actuated by their volume measurement indicators i.e. the revolving pointer 27 and the scale 15. The photocell assemblies provide electrical output pulses which are adapted to index unit volume digital counters 63 and 62 for the meter 14 and prover bell, respectively. When the first pulse from the photocell assembly 28 is received by the unit volume counter 62 for the prover bell, the counter enables the gate circuit 85 which permits pulses from the measure clock 60 to be fed to the bell clock digital counter 54. When a unit volume has been measured and indicated by the prover bell the photocell assembly 28 will cause the unit volume counter 62 to inhibit the gate circuit 85. The counter 54 will then have a pulse count (units of time) indicative of a standard unit volume.

Likewise, when the first pulse from the photocell assembly 24 is received by the unit volume counter 63 for the meter 14, the counter enables the gate circuit 86 which permits pulses from the same measure clock 60 to be fed to the meter clock digital counter 53. When an equal unit volume has been measured as indicated by the pointer 27 and corresponding pulses received by the unit volume counter 63, the counter will inhibit the gate circuit 86 and the meter clock counter 53 will have a pulse count (units of time) also indicative of the same standard unit volume as measured by the prover bell.

The respective pulse count in both counters 53 and 54 are next entered into the arithmetic unit 51 operated by the compute clock 59 whereupon the ratio of the pulse count in the bell clock counter 54 to the pulse count in the meter clock counter 53 is computed and an output thereof visually displayed for example as a percentage.

Accordingly, having set forth what is at present considered to be the preferred embodiment of the subject invention,

I claim:

1. The method of proving gas meters and the like comprising the steps of:

measuring a unit volume of a selected fluid in a proving standard and providing an electrical output signal consisting of a first plurality of pulses generated in accordance with the measurement reading of said unit volume provided by said standard's volume indicator, said pulses corresponding to predetermined unit measures of time;

measuring the same unit volume of said selected fluid in a meter under test and providing another electrical output signal consisting of a second plurality of pulses generated in accordance with the measurement reading of said unit volume as provided by said meter's volume indicator, said second pulses also corresponding to said same predetermined unit measures of time;

entering said first and second plurality of pulses into computing apparatus, said computing apparatus then operating to provide a signal output comprising the correlation ratio of said first plurality of pulses to said second plurality of pulses; and displaying said signal output as a measure of calibration between the proving standard and the meter under test;

said step of measuring a unit volume in said proving standard and providing an electrical output signal consisting of enabling a first pulse gate circuit upon initiation of the measuring step, feeding pulses of predetermined frequency from a measure clock oscillator to a pulse counter until said unit volume is measured and then inhibiting said pulse gate circuit, and thereafter maintaining the pulse count in said counter until the step of entering said pulses into said computing apparatus occurs; and said step of measuring said unit volume in said meter and providing another electrical output signal consisting of enabling a second pulse gate circuit upon initiation of the respective measuring step, feeding pulses of said predetermined frequency from the same said measure clock oscillator to another counter circuit, inhibiting said pulse gate circuit when said unit volume measurement reading is provided by said meter's volume indicator, and thereafter maintaining the pulse count in said second pulse counter until said step of entering said second plurality of pulses into said computing apparatus occurs.

2. The method as defined by claim 1 and wherein said step of entering said first and second plurality of pulses into said computing apparatus consists in entering the pulse count of both counters into digital computing apparatus and computing the ratio of said first plurality of pulses to the second plurality of pulses by the rate multiplier method of digital calculation.

3. Electrical apparatus for proving gas meters and the like, wherein the improvement comprises:

a proving standard and a meter under test, each having measured volume indicator means associated therewith;

fluid conduit means interconnecting said standard and said meter under test;

control means coupled to said conduit means for controlling fluid flow in said fluid conduit means;

first and second transucer means having a selectively gated output respectively responsive to the volume indicator means of said standard and said meter, providing electrical output signals in response to the volume measurement provided by said indicator means;

a clock oscillator providing a train of pulses of a predetermined frequency;

a first and second unit volume counter respectively coupled to said first and second transducer means, each providing an electrical output signal at the beginning and end of a measured unit volume;

a first and second pulse gate circuit respectively coupled to said first and second unit volume counter, and being responsive to the electrical output signals therefrom to pass pulses applied from said first oscillator from the beginning to the end of the respective unit volume measurement and thereafter inhibiting pulses;

a first and second clock counter coupled to said clock oscillator respectively through said first and second pulse gate circuit and being operable to count the number of pulses applied thereto, said pulses accordingly being unit measures of time by which said clock counters measure elapsed time between the beginning and end of a respective unit volume measurement;

an arithmetic unit coupled to said first and second clock counter and being selectively operable to calculate the ratio of the pulse count in the first clock counter to the pulse count in the second clock counter and provide an output signal indicative thereof; and means coupled to said arithmetic unit and being responsive to the output signal thereof to provide an indication of said ratio.

4. The apparatus as defined by claim 3 wherein said first and second transducer means comprise photoelectric transducers.

5. The apparatus as defined by claim 3 wherein said standard comprises a prover bell having an indicator scale with light interruption means selectively located thereon and said meter includes a meter index having a dial pointer, and wherein said first and second transducer means comprises photoelectric transducers respectively responsive to and operated by said light interruption means and said pointer.

6. The apparatus as defined by claim 5 wherein said first photo-electric transducer comprises a light source directing a beam of light past said indicator scale to a photocell and said second photo-electric transducer comprises a retroreflective photo-electric scanner.

7. The apparatus as defined by claim 3 and additionally including electrical programming means and digital control logic circuit means for automatically controlling the operation of the apparatus throughout a proving cycle.

8. The apparatus as defined by claim 7 wherein said programming means comprises a step counter adapted to index through a plurality of operating states in response to consecutive input signals applied thereto and providing selected output signals to said digital control logic circuit means.

9. The apparatus as defined by claim 7 wherein said first and second unit volume counters comprise binary counters and additionally including respective selectively enabled digital logic gates coupled between said counters and the respective transducer means coupled thereto.

10. The apparatus as defined by claim 9 and wherein said first and second pulse gate circuit each comprises digital logic gates controlled respectively by said first and second unit volume binary counters.

11. The apparatus as defined by claim 3 wherein said first and second clock counters are comprised of binary counters and said arithmetic unit includes rate multiplier circuitry providing the binary division function.

12. The apparatus as defined by claim 3 and additionally including another clock oscillator having an enabled output, at the end of respective unit volume measurements, comprising a train of pulses of a predetermined frequency, wherein said first and second clock counters comprises digital counters, and wherein said arithmetic unit includes a digital rate multiplier circuit being coupled to the count output of the second clock counter and operated by said train of pulses from said another clock oscillator, a rate multiplier output pulse counter coupled to the rate multiplier, a comparator circuit coupled between said rate multiplier output pulse counter and the count output of the first clock counter, said comparator being operable to provide a termination signal inhibiting the output of said another clock oscillator at the end of the ratio calculation, and counter means selectively enabled in accordance with the operation of said comparator, coupled to said another clock oscillator receiving pulses therefrom providing a digital representation of said ratio calculation.

13. The apparatus as defined by claim 12 wherein said indication means comprises visual display means coupled to said last recited counter means to provide a visual indication of said ratio calculation.

14. The apparatus as defined by claim 3 and additionally including self checking means including selectively operated circuit means operating said second clock counter in accordance with the operation of said first unit volume counter.

* * * * *